United States Patent [19]

Lüscher

[11] Patent Number: 4,508,959

[45] Date of Patent: Apr. 2, 1985

[54] APPARATUS FOR HEATING STACKABLE DISHES

[75] Inventor: Paul Lüscher, Bern, Switzerland

[73] Assignee: Lükon, Fabrik für elektrothermische Apparate und elektrische Stabheizkörper, Paul Lüscher, Täuffelen, Switzerland

[21] Appl. No.: 513,096

[22] Filed: Jul. 12, 1983

[30] Foreign Application Priority Data

Jul. 21, 1982 [CH] Switzerland .......................... 4439/82

[51] Int. Cl.³ ........................ F24C 15/18; F27D 11/02
[52] U.S. Cl. .................................. 219/385; 219/386; 219/214; 219/521
[58] Field of Search .............. 219/385, 386, 521, 214; 312/306, 71; 221/9, 13, 14, 258, 279, 247, 248; 211/49 D; 220/93

[56] References Cited

U.S. PATENT DOCUMENTS

| | | | |
|---|---|---|---|
| 2,279,936 | 4/1942 | Brodie | 221/247 |
| 2,433,560 | 12/1947 | Hurley | 221/13 |
| 3,167,369 | 1/1965 | Haag | 220/93 |
| 3,315,840 | 4/1967 | Tollkuhn | 221/13 |
| 3,351,741 | 11/1967 | Shelley | 219/385 |
| 3,436,525 | 4/1969 | Stanford | 219/385 |
| 3,493,725 | 2/1970 | MacKay | 219/385 |
| 3,536,891 | 10/1970 | Lee | 219/385 |
| 4,391,387 | 7/1983 | Bayne | 221/13 |

FOREIGN PATENT DOCUMENTS

| | | | |
|---|---|---|---|
| 626277 | 8/1961 | Canada | 219/386 |
| 76451 | 11/1954 | Netherlands | 221/13 |

Primary Examiner—Roy N. Envall, Jr.
Assistant Examiner—Teresa J. Walberg
Attorney, Agent, or Firm—Burns, Doane, Swecker & Mathis

[57] ABSTRACT

The present invention relates to an apparatus for heating stackable dishes. The apparatus includes a shaft-like heatable housing with an open top which can be closed off with a cover. A support for a stack of dishes is disposed within the interior of the housing. The support moves translationally in the vertical direction on guide rails and is linked to endless chains which are driven by an electric motor. By operating the electric motor, the support with the stack of dishes is moved to a vertical position which is convenient for removing or inserting dishes. This movement may be executed following an automatic opening of the cover. The operator does not need to bend over or to stretch to reach the dishes. An automatic control further serves to lower the stack of dishes into the housing and to close the cover after the passage of a predetermined time interval at the desired vertical position.

11 Claims, 3 Drawing Figures

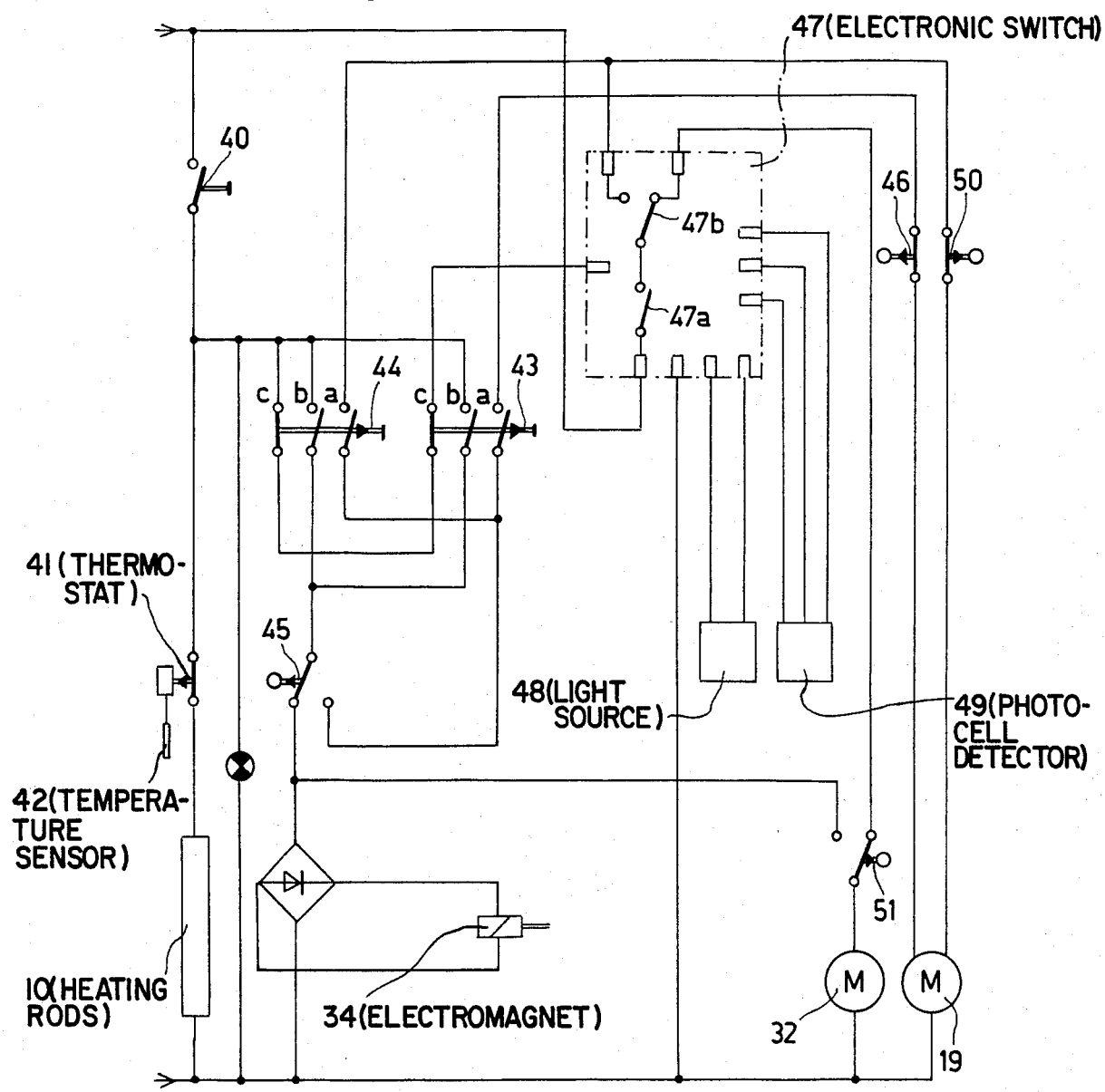

APPARATUS FOR HEATING STACKABLE DISHES

BACKGROUND AND SUMMARY OF THE PRESENT INVENTION

The present invention relates to an apparatus for heating stackable dishes.

Various embodiments of plate warmers are known. Some have cabinet-type housings with doors on one or two sides. Plate and cup warmers are also known which have service openings on either side extending over their entire height, which openings can be closed off by hinged flaps. A stack of plates, for example, may be held with both hands and passed through these openings to load or unload the warmer. There are also plate warmers on the market with shaft-like housings of cylindrical or polygonal shapes and with round doors disposed in the center.

A disadvantage of all of these structures is that operating personnel must bend over the apparatus, which stands on the floor, or must bend their knees. Alternatively, if the apparatus stands on a table, at least for taller stacks of dishes, the operating personnel must reach up a substantial distance for loading or unloading the dishes from the apparatus.

Plate stack holding devices are known which comprise springs that are compressed by a stack of plates. When plates are removed, some of the load is removed from the springs, and the springs push the remaining plates upward until equilibrium with the remaining weight is attained. The aim of this spring arrangement is to maintain the top of the stack of plates at approximately a constant level. However, with this type of device, it is not possible to selectively adjust the level. Even plates of the same type have different weights. Therefore, if the device is mounted in a shaft-like housing with an open top, a few plates may extend over the top edge of the opening making it impossible to close off the housing with a cover. In this instance, the plate stack holding device cannot be adapted for use as a plate warmer because the heat loss would be much too great.

Accordingly, it is an object of the present invention to provide an apparatus for heating stackable tableware dishes whereby these disadvantages are avoided while at the same time the apparatus is convenient to operate and service.

These objects and others of the present invention are achieved with an apparatus including a heatable housing with an open top and a cover adapted to close the open top. A support for a stack of dishes is arranged in the housing and may be selectively raised and lowered by a power-driven mechanism for selectively raising and lowering the support.

Preferably, a second power-driven mechanism is provided for opening and closing, i.e., raising and lowering the cover. Also, an arrangement may be provided whereby the pressing of a pushbutton switch causes the cover to be opened, i.e., raised, whereupon the support can be raised or lowered to a desired height. In this arrangement, a time delay may be provided which is started when the pushbutton is released to cause a drive arrangement to lower the support after a predetermined time interval. This drive arrangement may be disengaged by a sensing arrangement which detects the passage of a top of the stack of dishes on the support down through the upper housing opening. At this point, the cover is automatically closed.

BRIEF DESCRIPTION OF THE DRAWINGS

A preferred embodiment of the present invention will be described in greater detail with reference to the accompanying drawings, wherein like members bear like reference numerals, and wherein:

FIG. 3 is a schematic electrical switching circuit of the plate warmer.

DETAILED DESCRIPTION OF THE PREFERRED EMBODIMENT

Figure 1:
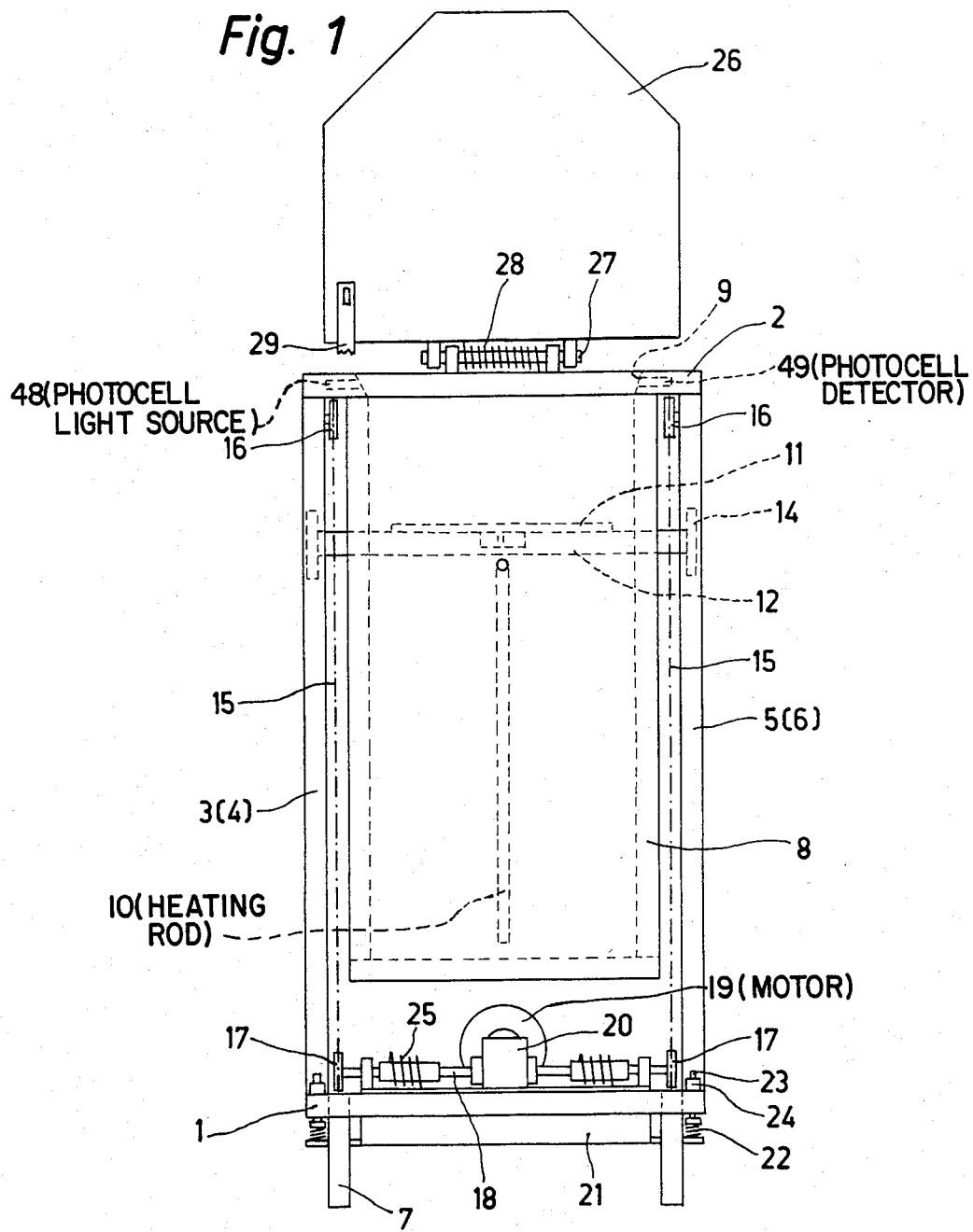
FIG. 1 is a front view of a plate warmer with the exterior cover removed.

The plate warmer of the present invention is comprised of a stand with a square horizontal bottom frame plate 1 and a horizontal upper frame plate 2 which is also square. The bottom frame plate 1 is connected to the upper plate 2 on each side by two vertical guide rails (3 and 4, and 5 and 6, respectively). The bottom frame plate 1 rests on supports 7 which advantageously may have casters or the like (not shown). The exterior covering of the plate warmer, which has four vertical walls, is also not shown in the drawings.

A cylindrical, shaft-like, thermally insulated interior housing 8 with its top end open is mounted in the stand. The interior space of the housing 8 is entirely accessible via a circular opening 9 in the upper frame plate 2. Two electrical heating rods 10 are provided for heating the interior space of the housing 8. These rods 10 are mounted in opposing, i.e., front and back, vertical positions on the housing walls in recesses in the walls.

A horizontal support plate 11 is disposed in the interior space of the housing 8 for supporting a stack of plates (not shown) which are to be heated. The support plate 11 is mounted on a carriage 12. The support plate 11 may be removed when the interior of the housing is cleaned, e.g., with a vacuum cleaner hose. The side arms of the carriage 12 extend through two narrow slots 13 which are opposite each other in the perimeter wall of the housing 8 and extend vertically over the entire usable height of the housing 8. The ends of these arms are slidably guided in the vertical direction by the guide rails (3 and 4, and 5 and 6, respectivey), with, e.g., plastic glide shoes 14. Also, each end of the arms is attached by screws to an endless articulated (e.g., sprocket) chain 15 which runs in a vertical plane exterior to the housing 8. In the preferred embodiment, there are two such chains 15. At the top of the container 8, the chains 15 pass over freely rotating sprocket wheels 16, and, at the bottom the chains 15 pass over drive sprocket wheels 17 mounted on drive shafts 18 (FIG. 1) which can be electrically driven by an electric motor 19 through a transmission 20.

The drive unit comprised of the sprocket wheels 17, the shafts 18, the motor 19, and the transmission 20 is mounted on a base plate 21 which is pressed downward by adjustable compression springs 22 to hold the chains 15 under tension. Tightening screws 23 for the compression springs 22 are arranged in threaded bushings 24 which are welded to the bottom frame plate 1.

When the motor 19 is run clockwise or counterclockwise, the lengths of the chains 15 which are attached to the carriages 12 are moved up or down. Helical flat springs 25 are mounted on the two drive shafts 18 in such a way that, as the chain lengths connected with the carriage 12 move downward, the springs 25 are wound up. Thereafter, when the carriage 12 moves upward, the springs 25 assist the drive motor 19 in lifting the stack of dishes arranged on the support plate 11.

The access opening 9 on the top of the housing 8 opens out upwardly at an angle, i.e., the opening 9 is flared outwardly at the top. The opening 9 may be closed off by a cover 26 which is thermally insulated and which closes and opens automatically. The cover 26 is pivotable around a pivot pin 27 on which a pre-tensioned torsion spring 28 is mounted which spring 28 tends to move the cover 26 into the cover's open position. A tubular piece 29 is pivotally mounted on one side of the cover 26. The tubular piece 29 passes through a slot-shaped opening in the upper frame plate 2 and extends below the plate 2 to be telescopically received over a tie rod 30. The tie rod 30 is pivotably connected to a crank 31 driven by a drive motor 32.

A catch collar 33 is attached to the bottom end of the tubular piece 29. The collar 33 engages a pawl 35 which may be retracted by an electromagnet 34. The pawl 35 and the electromagnet 34 are attached to the tie rod 30 in such a way that when the cover 26 is closed, the pawl 35 engages the collar 33 in a locking configuration. In this way, the cover 26 is maintained in a closed position as long as the crank arm 31 is directed downward.

The pawl 35 is retracted from the collar 33 by excitation of the electromagnet 34 to release the locking of the cover 26 which moves rapidly upward under the force of the spring 28. A spring-loaded detent 36 is preferably mounted on the tubular piece 29 to cushion this upward motion of the cover 26 by acting under spring loading against the bottom side of the upper frame plate 2.

When the cover 26 is open and the drive motor 32 is started, the motion of the crank 31 causes the electromagnet 34 and pawl 35 to move upward, until the pawl 35 engages the catch collar 33 in a locking configuration. When the crank 31 is then moved back downwardly, the cover 26 is also pulled downward to the completely closed position when the crank arm 31 returns to a downward orientation. Another pawl 37 prevents the crank 31 from being pulled upward by the torsion spring 28 when the cover 26 is in the closed position.

The operation of the plate warmer will now be described with the aid of FIG. 3, which is a schematic of the electrical circuit of the plate warmer.

A main switch 40 turns on the heating rods 10 which provide heat inside the housing 8. The temperature inside the housing 8 is controlled by a thermostat 41 with an associated temperature sensor 42.

Figure 2:
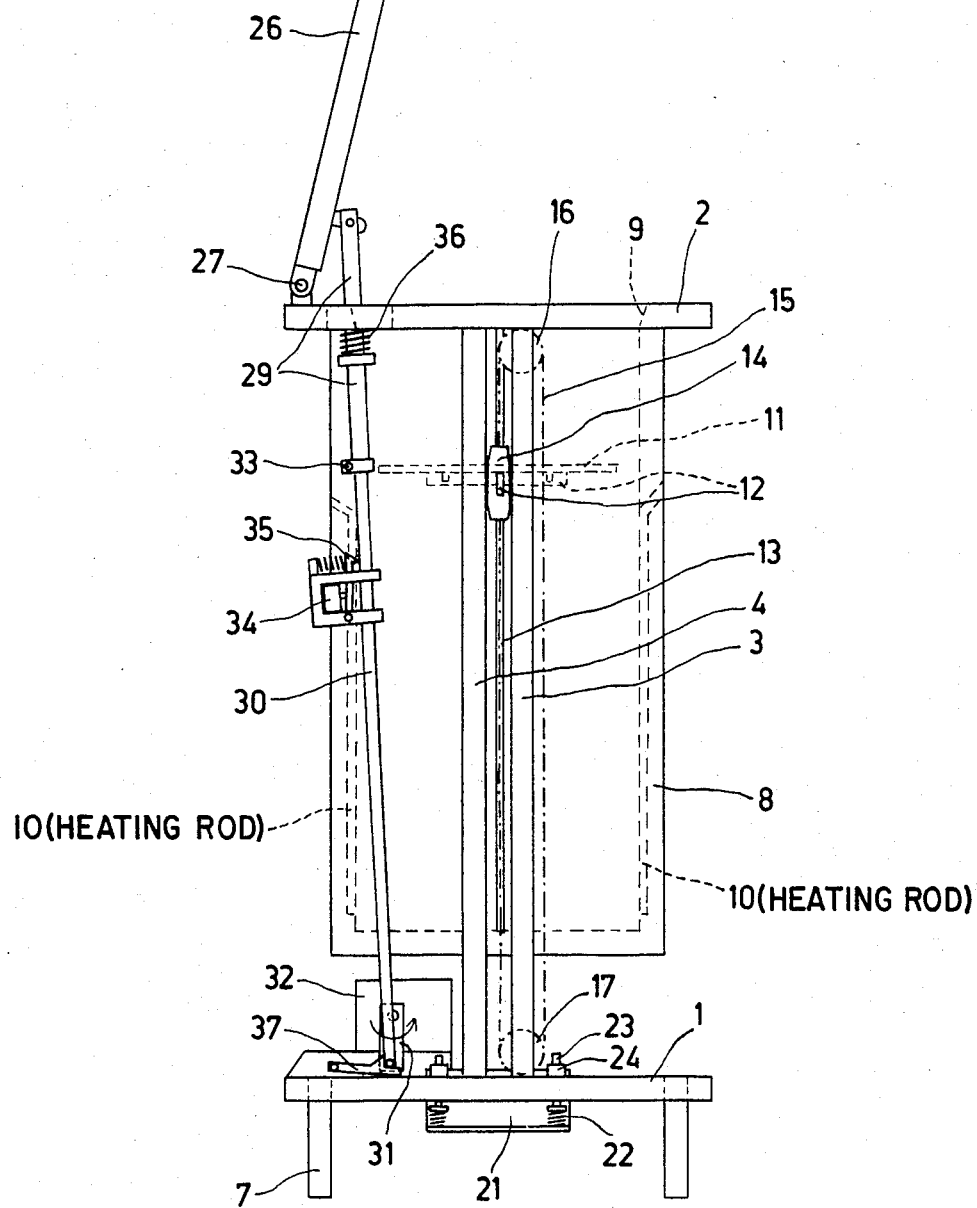
FIG. 2 is a side view of the plate warmer of FIG. 1.

Two pushbutton switches 43 and 44 (not shown in FIG. 1 or 2) are provided, preferably on top of the upper frame plate 2, for raising and lowering the support plate 11 in the housing 8. The pushbutton switches 43 and 44 each have two normally open contacts a and b, and one normally closed contact c.

When the pushbutton of the switch 43 is pushed, the circuit powering a rectifier which supplies the electromagnet 34 is closed, via contact b of switch 43 and via limit switch 45 which is tripped by either the cover 26 or the tubular piece 29. The limit switch 45 is in the position shown, as long as the cover 26 is not in the open position, i.e., when the cover 26 is closed. The pawl 35 is retracted by the electromagent 34 to cause the cover 26 to open under the influence of the spring 28. When the cover 26 opens, the limit switch 45 turns the electromagnet 34 back off and, via contact a of switch 43 and an upper stroke-limiting switch 46 (normally closed), closes a circuit to the drive motor 19. Since the cover 26 is open, the motor 19 moves the support plate 11 which is carrying the stack of plates in an upward direction. Such upward movement continues as long as the pushbutton 43 continues to be depressed, unless or until the upper stroke-limiting switch 46 is tripped (opened) by contact with the carriage 12.

Opening contact c of the switch 43 de-energizes a timed relay in an electronic switch 47 and thereby resets, i.e., opens, the relay. When the switch 43 is released, the running of this timed relay begins (due to the closing of contact c), and after a preset time interval the relay closes a contact 47a in the electronic switch 47.

An infrared photocell system comprising a light source 48 and a detector 49 disposed opposite each other in the top end region of the perimeter wall of the housing 8 (see FIG. 1) monitors the top opening 9 of the housing 8. When the stack of plates extends over the top edge of the housing 8, a switch 47b is switched out of the position shown and into a position to close the circuit from the contact 47a of the timed relay through a lower stroke-limiting switch 50 to the drive motor 19. Consequently, the drive motor 19 moves the support plate 11 bearing the stack of plates in a downwardly directed movement until the photocell system 48 and 49 is unobstructed.

At this point, the switch 47b in the electronic switching unit 47 switches back into the illustrated position and closes a circuit through a limit switch 51. The limit switch 51 is tripped (or opened) by contact with the cover 26 and this circuit continues to the drive motor 32. The switch 51 stays in the closed position (as shown) unless and until the cover 26 is closed. The drive motor 32, with its power circuit thus closed, begins to turn, and the crank 31 closes the cover 26 in the manner previously described. As soon as the cover 26 reaches the closed position, the cover 26 trips limit switch 51 out of the illustrated closed position, as a result of which the motor 32 is shut off.

The actuation of the drive motor 32 is now in parallel with that of the electromagnet 34. The next time the pushbutton switch 43 is actuated, the motor 32 begins briefly to turn, until the cover 26 leaves its closed position and the limit switch 51 switches back to the position illustrated. Thus, motor 32 operates as a means of automatically de-actuating the magnet 34.

The obvious occasion for bringing about the described operating sequence initiated by pressing the pushbutton switch 43 is when it is desired to remove plates from the plate warmer.

When it is desired to load the warmer with fresh plates, the operator pushes the pushbutton switch 44. The resulting operation is the same as with the pushbutton switch 43, with the exception that after the cover 26 is opened a circuit is established through the limit switch 45, contact a of the switch 44, and the lower stroke-limiting switch 50, to the motor 19, whereby the motor 19 lowers the support plate 11 into the housing 8.

The other operating steps, which occur after the pushbutton switch 44 is released, are the same as those described above for the pushbutton switch 43.

It should be understood that the preceding description with reference to the drawings is merely a description of a preferred embodiment of the inventive warmer for dishes, and that numerous variants are possible. The arrangement for guiding and driving the raisable and lowerable support plate in the housing may be embodied in any appropriate fashion. The same applies to the mechanism for opening and closing the cover. The mechanism for raising and lowering the support plate and the mechanism for opening and closing the cover may be driven by a common drive motor, with switchable couplings as the means of transmission.

Accordingly, the present invention is not limited to the particular embodiment disclosed. It is expressly intended that all variations and changes which fall within the spirit and scope of the present invention as defined in the claims be embraced thereby.

What is claimed is:

1. An apparatus for heating stackable dishes, comprising a heatable housing with an open top, a cover for closing the open top, a support for a stack of dishes, the support being arranged in said housing and being adapted to be raised and lowered, power-driven means for selectively raising and lowering said support, the power-driven means for raising and lowering the support comprising drive means which is electrically controllable for lowering the support, a first switch being included in a circuit for the drive means, said switch being controlled by a sensing arrangement arranged at an upper edge of the housing, whereby when a top of a stack of dishes resting on the support passes down through said upper edge said first switch is opened, and a second switch in the circuit for the drive means, time delay means, the second switch being closed after a predetermined time interval by the time delay means, the time delay means being actuated by a manually operable switch which controls the raising and lowering of the support.

2. The apparatus according to claim 1 wherein the support is arranged on a carriage which is movably guided on vertical guide rails.

3. The apparatus according to claim 1, wherein the support is drivingly linked to at least one chain, the chain passing over a sprocket, and the power-driven means for raising and lowering the support including drive means for rotatably driving said sprocket.

4. The apparatus according to claim 1, further comprising second power-driven means for opening and closing the cover.

5. The apparatus according to claim 1, wherein the sensing arrangement comprises a photocell system including a light source and a detector.

6. An apparatus for heating stackable dishes, comprising a heatable housing with an open top, a cover for closing the open top, a support for a stack of dishes, the support being arranged in said housing and being adapted to be raised and lowered, power-driven means for selectively raising and lowering said support, the power-driven means for raising and lowering the support comprising drive means which is electrically controllable for raising the support, a limit switch being included in a circuit for the drive means, the limit switch being closed when the cover is in the open position.

7. An apparatus for heating stackable dishes, comprising a heatable housing with an open top, a cover for closing the open top, a support for a stack of dishes, the support being arranged in said housing and being adapted to be raised and lowered, power-driven means for selectively raising and lowering said support, the power-driven means for raising and lowering the support comprising drive means which is electrically controllable for lowering the support, a switch being included in a circuit for the drive means, said switch being controlled by a sensing arrangement arranged at an upper edge of the housing, whereby when a top of a stack of dishes resting on the support passes down through said upper edge said switch is opened, the switch being a double throw switch which closes a circuit for actuating drive means for closing the cover.

8. The apparatus according to claim 7, further comprising a second switch in the circuit for the drive means, the second switch being closed after a predetermined time interval by time delay means, the time delay means being actuated by a manually operable switch which controls the raising and lowering of the support.

9. An apparatus for heating stackable dishes, comprising a heatable housing with an open top, a cover for closing the open top, a support for a stack of dishes, the support being arranged in said housing and being adapted to be raised and lowered, power-driven means for selectively raising and lowering said support, and second power-driven means for opening and closing the cover.

10. The apparatus according to claim 9, further comprising a spring for biasing said cover toward an open position, and a tie rod for moving said cover toward a closed position.

11. The apparatus according to claim 10, wherein the tie rod is coupled by a releasable latch coupling to a second rod which is pivotably connected to a crank arm of the second power-driven means for closing the cover.

* * * * *